US012510288B2

(12) United States Patent
Krumbiegel et al.

(10) Patent No.: US 12,510,288 B2
(45) Date of Patent: Dec. 30, 2025

(54) SYSTEMS AND METHODS FOR A REFRIGERATION DEVICE HAVING A LID ASSEMBLY

(71) Applicant: Perlick Corporation, Milwaukee, WI (US)

(72) Inventors: Karl R. Krumbiegel, Cedarburg, WI (US); Tobin G. Ellis, Las Vegas, NV (US); Jonathon Haggerty, Whitefish Bay, WI (US); Brian J. Madson, Menomonee Falls, WI (US)

(73) Assignee: Perlick Corporation, Milwaukee, WI (US)

( * ) Notice: Subject to any disclaimer, the term of this patent is extended or adjusted under 35 U.S.C. 154(b) by 0 days.

(21) Appl. No.: 19/183,606

(22) Filed: Apr. 18, 2025

(65) Prior Publication Data

US 2025/0244069 A1 Jul. 31, 2025

Related U.S. Application Data

(60) Continuation of application No. 18/218,509, filed on Jul. 5, 2023, now Pat. No. 12,298,053, which is a division of application No. 17/941,711, filed on Sep. 9, 2022, now Pat. No. 11,732,947, which is a continuation of application No. 16/779,049, filed on Jan. 31, 2020, now Pat. No. 11,466,922.

(51) Int. Cl.
*F25D 11/02* (2006.01)
*F25D 23/02* (2006.01)

(52) U.S. Cl.
CPC ............ *F25D 11/02* (2013.01); *F25D 23/021* (2013.01); *F25D 23/026* (2013.01); *E05Y 2900/31* (2013.01); *F25D 2323/024* (2013.01)

(58) Field of Classification Search
CPC .. F25D 23/026; F25D 11/02; F25D 2323/024; F25D 23/021; E05Y 2900/31
See application file for complete search history.

(56) References Cited

U.S. PATENT DOCUMENTS

| | | | | |
|---|---|---|---|---|
| 3,730,603 | A | 5/1973 | Looms | |
| 3,949,902 | A | 4/1976 | Thompson | |
| 4,757,913 | A * | 7/1988 | Yerman | B65D 43/20 220/345.5 |
| 5,249,435 | A | 10/1993 | Lever et al. | |
| 5,395,013 | A | 3/1995 | Billings | |
| 5,415,315 | A | 5/1995 | Ramirez | |
| 5,626,353 | A | 5/1997 | Campbell | |
| 6,038,865 | A | 3/2000 | Watanabe et al. | |
| 6,351,963 | B2 | 3/2002 | Surber et al. | |

(Continued)

*Primary Examiner* — Lionel Nouketcha
(74) *Attorney, Agent, or Firm* — Quarles & Brady LLP

(57) ABSTRACT

A refrigeration device can include a storage portion including a wall that facilitates thermal insulation of a compartment that is configured to store items at a temperature that is below ambient air temperature and a lid assembly that includes a first panel, a second panel, a handle, a hinge, and a track. The compartment may define an open top area that is bordered by a top surface of the storage portion. The lid assembly may be movably coupled to the refrigeration device at the top surface. The second panel can be configured to slide along the track to at least partially cover or uncover the portion of the open top area and may be configured to tilt relative to the first panel.

29 Claims, 14 Drawing Sheets

(56) References Cited

U.S. PATENT DOCUMENTS

| | | | | |
|---|---|---|---|---|
| 6,675,602 | B2 | 1/2004 | Goodman et al. | |
| 6,804,976 | B1 | 10/2004 | Dain | |
| 7,121,334 | B2 | 10/2006 | Cho et al. | |
| 7,197,888 | B2 | 4/2007 | LeClear et al. | |
| 7,451,614 | B2 | 11/2008 | Luehrs et al. | |
| 7,621,148 | B1 * | 11/2009 | Dain | F25D 23/025<br>220/592.01 |
| 7,640,696 | B2 | 1/2010 | Yingst | |
| 7,896,451 | B2 | 3/2011 | Walsh | |
| 7,958,673 | B2 | 6/2011 | Yingst et al. | |
| 8,152,256 | B2 * | 4/2012 | Kim | F25D 25/025<br>220/345.5 |
| 8,671,618 | B2 | 3/2014 | Yingst et al. | |
| 8,881,545 | B2 | 11/2014 | Lee et al. | |
| 9,339,124 | B2 | 5/2016 | Carter et al. | |
| 9,581,378 | B2 | 2/2017 | Czerwonky et al. | |
| 9,915,469 | B2 | 3/2018 | Huckaby et al. | |
| 10,196,255 | B2 | 2/2019 | Henriquez | |
| 10,501,307 | B2 | 12/2019 | Henriquez | |
| 2004/0046092 | A1 * | 3/2004 | Jung | A47B 97/00<br>248/200 |
| 2008/0229773 | A1 * | 9/2008 | Lee | F25D 23/026<br>312/405 |
| 2010/0018223 | A1 | 1/2010 | Sundhar | |
| 2015/0137671 | A1 | 5/2015 | Peake | |
| 2015/0208829 | A1 | 7/2015 | Halprin | |
| 2018/0120016 | A1 | 5/2018 | Maxwell et al. | |
| 2019/0204000 | A1 | 7/2019 | Flores | |
| 2020/0025437 | A1 * | 1/2020 | Park | F25D 23/02 |

* cited by examiner

SYSTEMS AND METHODS FOR A REFRIGERATION DEVICE HAVING A LID ASSEMBLY

CROSS-REFERENCES TO RELATED APPLICATIONS

This application is a continuation of U.S. patent application Ser. No. 18/218,509 filed on Jul. 5, 2023, which is a divisional of U.S. patent application Ser. No. 17/941,711 filed on Sep. 9, 2022, which is a continuation of U.S. patent application Ser. No. 16/779,049 filed on Jan. 31, 2020, the disclosures of which are incorporated by reference herein.

STATEMENT CONCERNING FEDERALLY SPONSORED RESEARCH AND DEVELOPMENT

Not applicable.

TECHNICAL FIELD

The present disclosure is generally related to refrigeration technology. More specifically, the present disclosure relates to an improved device for storing and chilling ingredients and accessories, such as beverage containers and ice, for example.

BACKGROUND

Restaurants, taverns, clubs, and other establishments in the hospitality industry often aim to serve beverages (e.g., cocktails) to patrons in an efficient and flavorful manner. Many of such establishments offer patrons a wide variety of beverages. Such beverages may be served in an individual bottle or concocted from a number of ingredients. Often these beverages and ingredients are best served chilled. As a result, storage and retrieval of containers holding these beverages and ingredients can present logistical issues for the establishment. For instance, without sufficient storage space for containers, a bartender may be required to step away from the bar frequently to retrieve additional containers from auxiliary refrigerators.

In addition to storing containers, often establishments aim to store ice in an accessible and efficient configuration. Establishments may employ ice in a variety of shapes and sizes, for example, cubes and spheres, to enhance aesthetics and drinkability of artisanal drinks. For instance, use of a single large ice format (e.g., cube, spear, globe, etc.) can enhance the flavor profile of the cocktail by reducing the surface area of the ice as compared to use of multiple smaller ice cubes, thereby slowing the melt time and inhibiting dilution of the cocktail. Moreover, premium ice with less trapped air tends to melt slower and thus further reduces the dilution rate. In general, the overall storage of disparate ice geometries and the efficiency of retrieval is improved when each ice type is partitioned and the bartender can retrieve the desired shape without excessive sorting, digging, or rearranging. In the absence of a dedicated storage solution, operators are often left to devise makeshift solutions for specialty ice, such as storing the ice in a portable cooler with dry ice or in an auxiliary cooler that is often inconveniently removed from the ideal bar area.

Further, artisanal ice often comes with heightened expectations regarding its appearance. For example, globe-shaped cocktail ice, in addition to other geometries, is generally expected to be clear without any sign of clouds or cracks. As a result, this ice is preferably stored within a particular temperature range and tempered prior to use to prevent cracking when the ice is placed in a beverage. Without a refined process of storing, retrieving, and tempering the specialty ice, the bartender is subject to various time and energy inefficiencies as well as compromising the intended aesthetic of the beverage.

Therefore, in view of at least the above, a need exists for an improved device for the storage of beverage ingredients, beverage containers, and/or ice in a refrigerated environment having a controlled temperature variation.

SUMMARY

Some embodiments described herein provide a refrigeration device capable of chilling beverage ingredients and accessories, such as beverage prep containers and ice. The refrigeration device includes a first compartment that defines a first open top area, a second compartment that defines a second open top area, and a wall disposed between the first compartment and the second compartment. The refrigeration device further includes a controller configured to control the temperature in at least one of the first compartment and the second compartment, a temperature regulator configured to adjust a thermal communication between the first compartment and the second compartment, and a lid assembly configured to cover the first open top area when in a fully closed position. The lid assembly includes a first panel and a hinge coupled to the first panel and configured to enable the lid assembly to move between a fully opened position and a partially closed position. The lid assembly further includes a second panel and a track configured to enable the second panel to slide relative to the first panel to move the lid assembly between a partially open position and the fully closed position.

In another embodiment, a refrigeration device capable of chilling beverage ingredients and accessories, such as beverage prep containers and ice, is provided. The refrigeration device includes a first compartment that defines a first open top area, a second compartment that defines a second open top area, and a wall disposed between the first compartment and the second compartment. The wall defines a duct therethrough that is configured to provide thermal communication between the first compartment and the second compartment. The refrigeration device further includes a controller configured to control the temperature in at least one of the first compartment and the second compartment and a damper configured to move relative to the duct to adjust the thermal communication between the first compartment and the second compartment by altering an overlap between the damper and the duct. The refrigeration assembly also includes a lid assembly. The lid assembly includes a first panel and a second panel. The first panel is configured to pivot relative to the first compartment, and the second panel is configured to translate relative to the first panel between an extended position and a retracted position.

In another embodiment, a refrigeration device is provided. The refrigeration device includes a first compartment that defines a first open top area, a second compartment that defines a second open top area, and a wall disposed between the first compartment and the second compartment. The refrigeration device further includes a controller configured to control the temperature in at least one of the first compartment and the second compartment, a temperature regulator configured to adjust a thermal communication between the first compartment and the second compartment, and a lid configured to cover at least a portion of the first open top area.

BRIEF DESCRIPTION OF THE DRAWINGS

The following detailed description is to be read with reference to the figures, in which like elements in different figures have like reference numerals. The figures, which are not necessarily to scale, depict selected embodiments and are not intended to limit the scope of embodiments of the invention. Given the benefit of this disclosure, skilled artisans will recognize the examples provided herein have many useful alternatives that fall within the scope of the invention.

DETAILED DESCRIPTION

Figure 1:
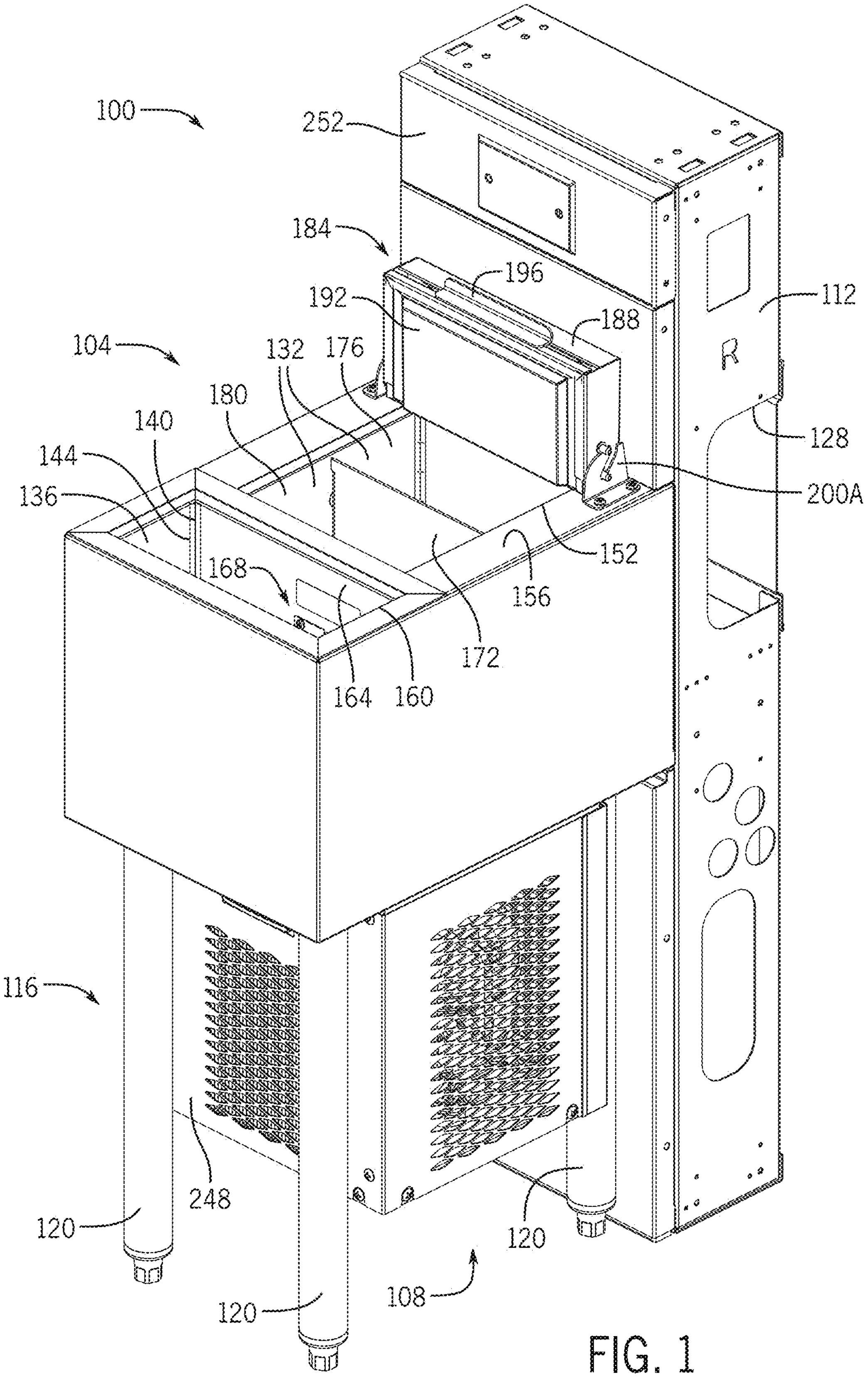
FIG. 1 is a top right isometric view of a refrigeration device including a lid assembly in a fully opened position according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Given the benefit of this disclosure, various modifications to the illustrated embodiments will be readily apparent to those skilled in the art and the underlying principles herein can be applied to other embodiments and applications without departing from the invention. Thus, embodiments of the invention are not intended to be limited to embodiments shown, but are to be accorded the widest scope consistent with the principles and features disclosed herein.

A refrigeration device 100 is shown in FIGS. 1-4. As illustrated, the refrigeration device 100 includes a storage portion 104, a refrigeration system 108, a mounting bracket assembly 112, and a base 116 that includes legs 120. In the illustrated embodiment, the refrigeration system 108 is configured to circulate fluid through a series of coils 124 (see, for example, FIG. 9), thereby providing refrigeration to at least a portion of the storage portion 104. The mounting bracket assembly 112 includes a plurality of engagement features 128 to enable mounting the refrigeration device 100 to a structure. For example, the mounting bracket assembly 112 may facilitate securing the refrigeration device 100 to a modular die wall. In other forms, a refrigeration device may be a freestanding unit such that it can be readily placed and incorporated with an existing environment (e.g., a back bar configuration).

As illustrated in FIG. 1, the storage portion 104 includes a first compartment 132 and a second compartment 136. The first compartment 132 and the second compartment 136 include corners 140 having rounded portions 144 thereby providing smooth corner surfaces therein. Each of the first compartment 132 and the second compartment 136 can be used to store a variety of items, such as, for example, ice, juice, spirits, vermouths, garnishes and other beverage ingredients. The items kept in the first compartment 132 and/or the second compartment 136 may be stored at a temperature below the ambient air temperature (e.g., the ambient indoor air temperature of an establishment). In the embodiment shown, a controller 148 (see, for example, FIG. 8) that is in communication with the refrigeration system 108 is configured as a thermostat and can control the operation of the refrigeration system 108 and thus influence the temperature of the first compartment 132 to generally maintain a user-settable temperature value or range. In other embodiments, the controller 148 may also control the temperature of the second compartment 136.

As further shown in FIG. 1, the first compartment 132 defines a first open top area 152 bordered by a top surface 156 of the storage portion 104. Similarly, the second compartment 136 defines a second open top area 160 bordered by the top surface 156. Additionally, the first compartment 132 defines a volume of approximately 0.34 cubic feet and the second compartment 136 defines a volume of approximately 0.21 cubic feet; however, other configurations and form factors are contemplated. In other embodiments, a storage portion of a refrigeration device can include first and second compartments, each having a volume between about 0.05 cubic feet and about 2 cubic feet, or between about 0.1 cubic feet and about 0.5 cubic feet, for instance.

The storage portion 104 further includes a wall 164 that is disposed between the first compartment 132 and the second compartment 136, and a temperature regulator 168, which will be described in detail below with reference to FIGS. 9-14. Also shown in FIG. 1 is a movable divider 172 arranged in the first compartment 132. The movable divider 172 divides the first compartment 132 into a first section 176 and a second section 180. In use, for example, the movable divider 172 may be used to separate products, such as ice, within the first compartment 132 to facilitate organization, tempering, and the like. In some embodiments, the first compartment 132 may be divided into a plurality of sections by a plurality of movable or stationary dividers. In other embodiments, the second compartment 136 may be divided into one or more sections by a movable or stationary divider. While the movable divider 172 is shown in the example embodiment as generally parallel with the wall 164, other configurations are possible, such as a movable divider generally perpendicular to the wall 164.

Figure 2:
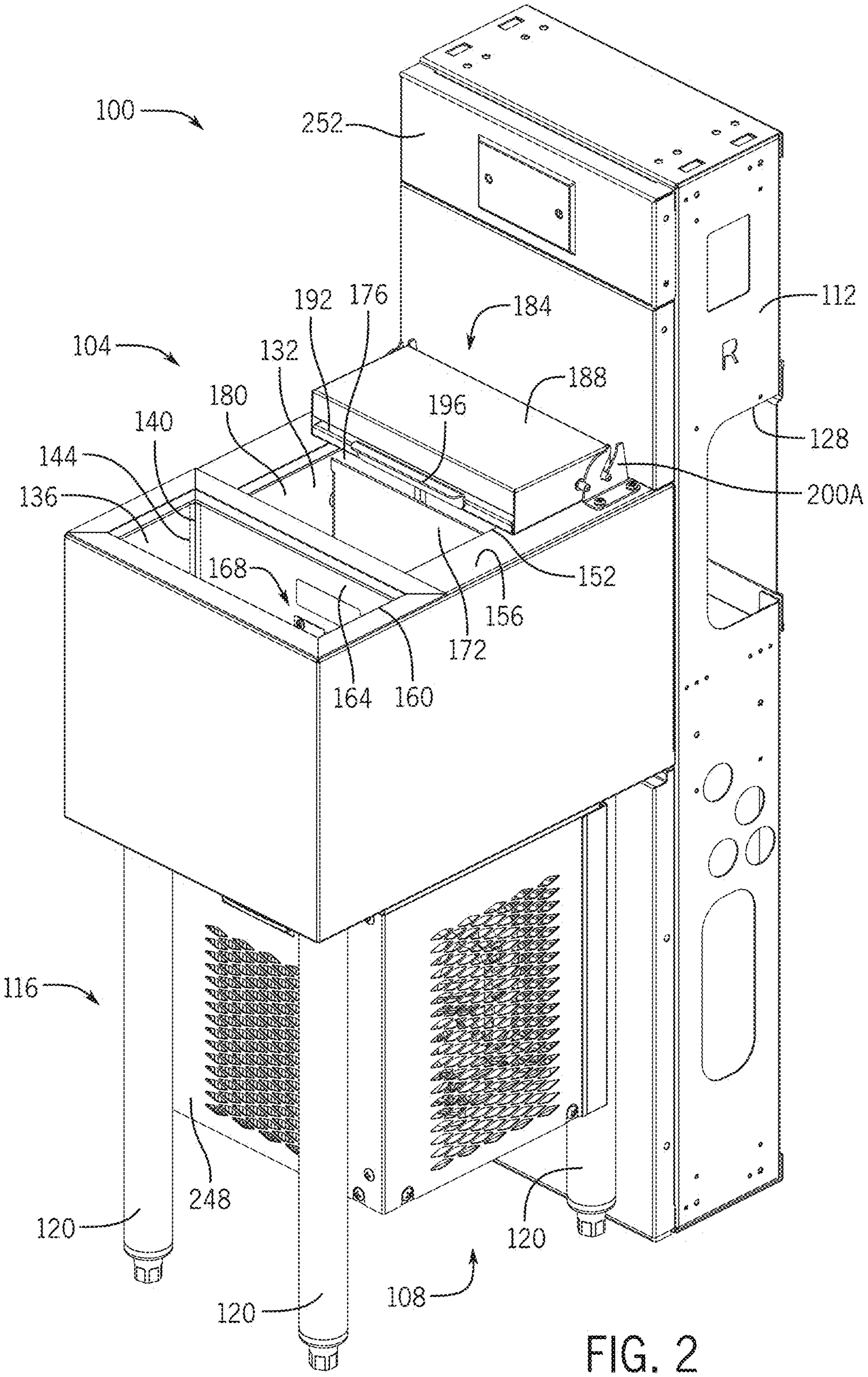
FIG. 2 is a top right isometric view of the refrigeration device of FIG. 1 including the lid assembly in a partially opened position.
Figure 3:
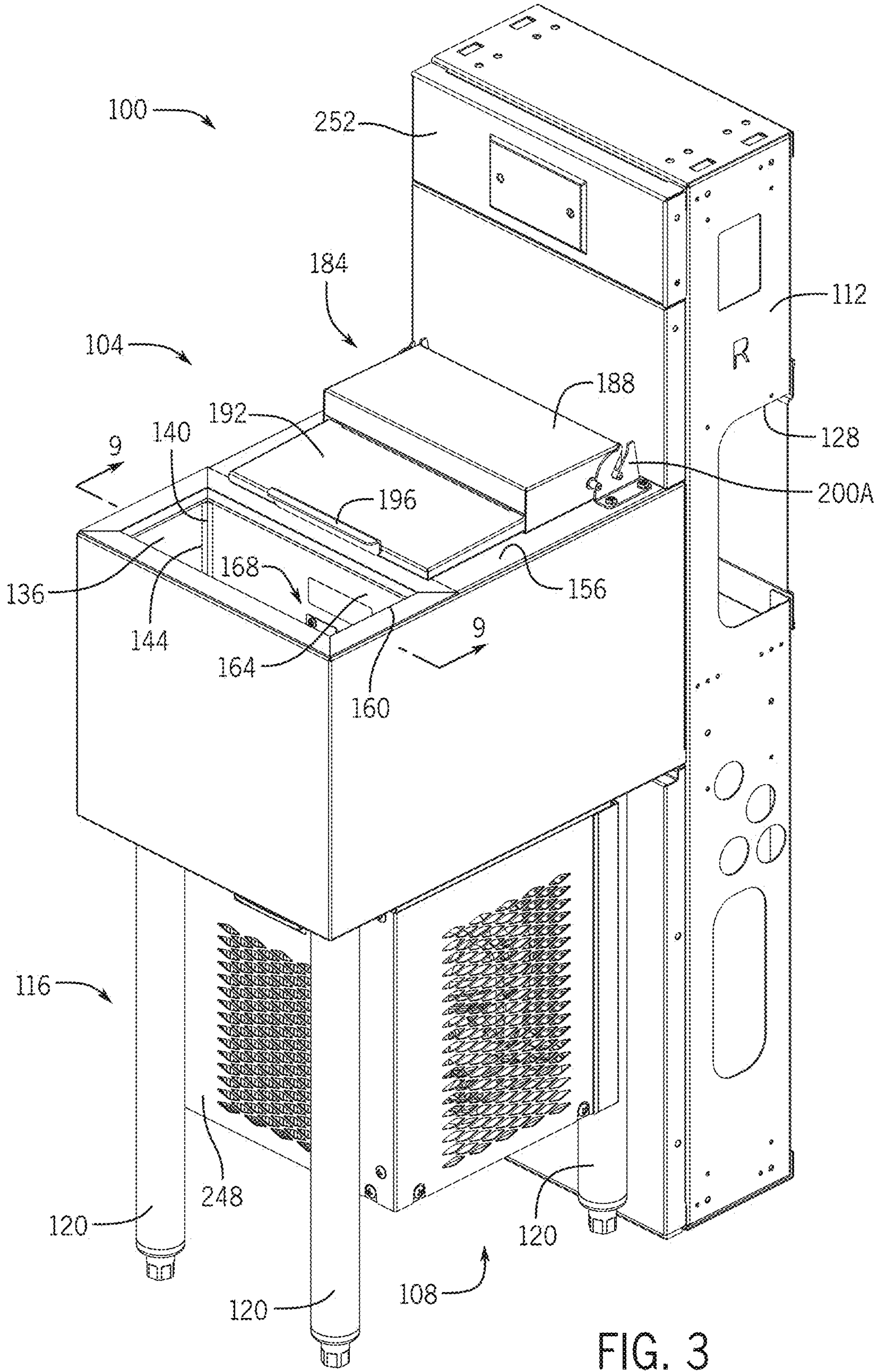
FIG. 3 is a top right isometric view of the refrigeration device of FIG. 1 including the lid assembly in a fully closed position.
Figure 4:
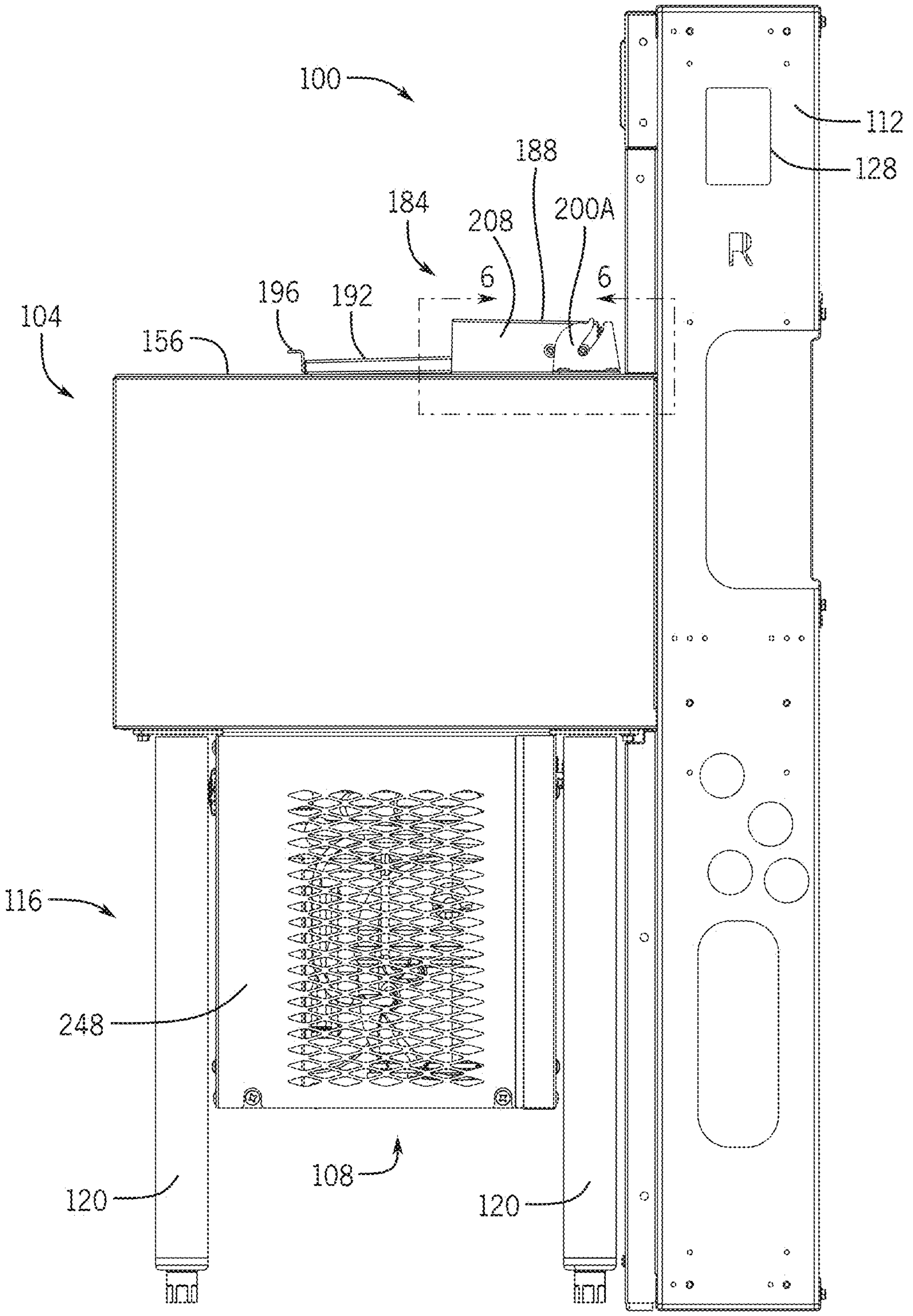
FIG. 4 is a right side view of the refrigeration device of FIG. 1 including the lid assembly in the fully closed position.

FIGS. 1-4 further illustrate various positions of a lid assembly 184. The lid assembly 184 includes a first panel 188, a second panel 192, and a handle 196. The lid assembly 184 is coupled to the refrigeration device 100 at the top surface 156 by hinges 200A and 200B, which will be described in greater detail below with reference to FIGS. 6 and 7. FIG. 1 illustrates the lid assembly 184 in a fully opened position, such that substantially all of the first open top area 152 is uncovered. FIG. 2 shows the lid assembly 184 in a partially closed position, such that a portion of the first open top area 152 is covered (e.g., the first section 176 is covered). It should be appreciated that the orientation of the lid assembly 184 depicted in FIG. 2 may be also considered partially open. FIGS. 3 and 4 illustrate the lid assembly 184 in a fully closed position such that the first open top area 152 is covered (e.g., the first section 176 and the second section 180 are covered).

Figure 5A:
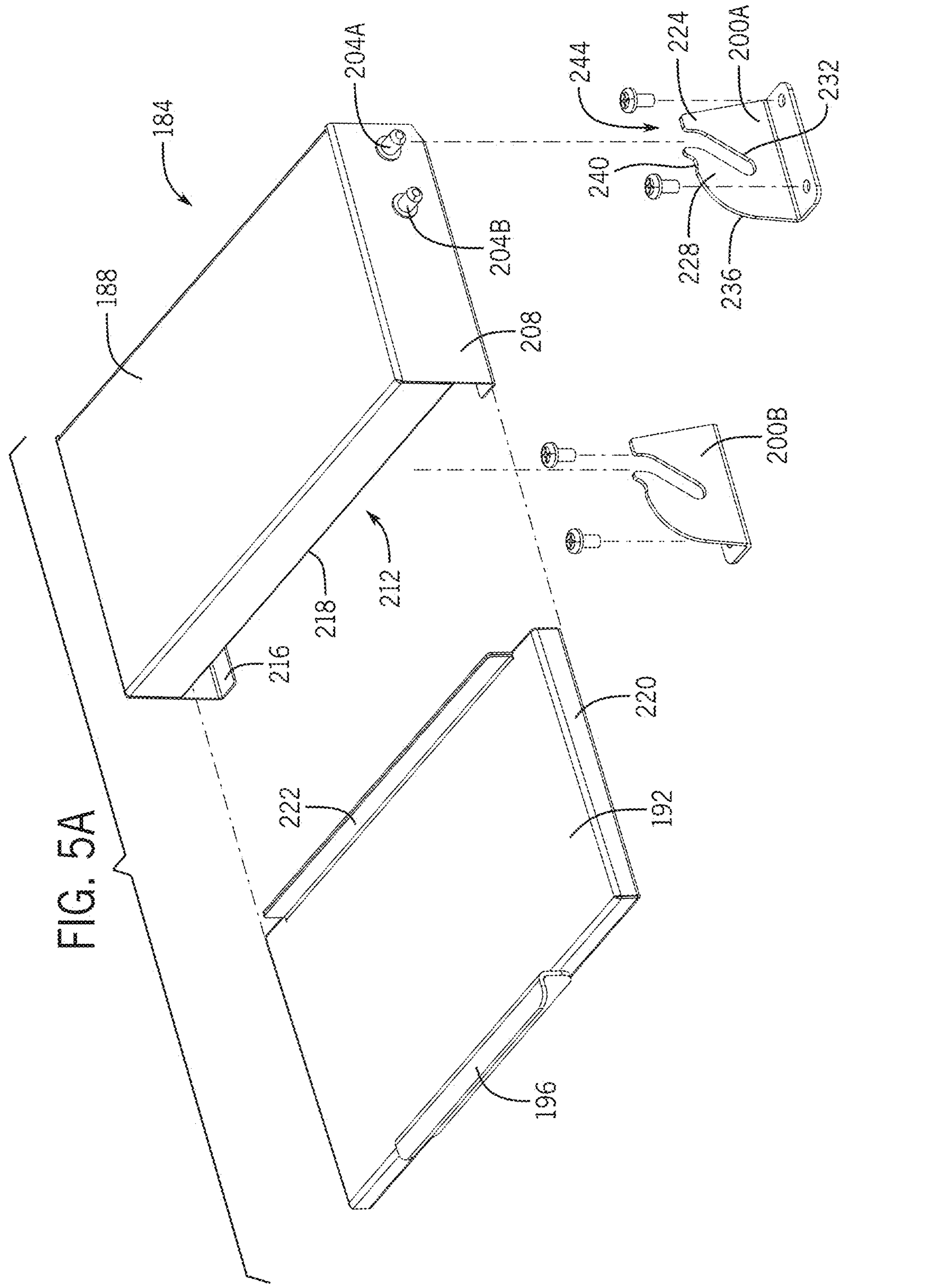
FIG. 5A is an exploded top isometric view of the lid assembly of FIG. 1 according to an embodiment of the invention.
Figure 5B:
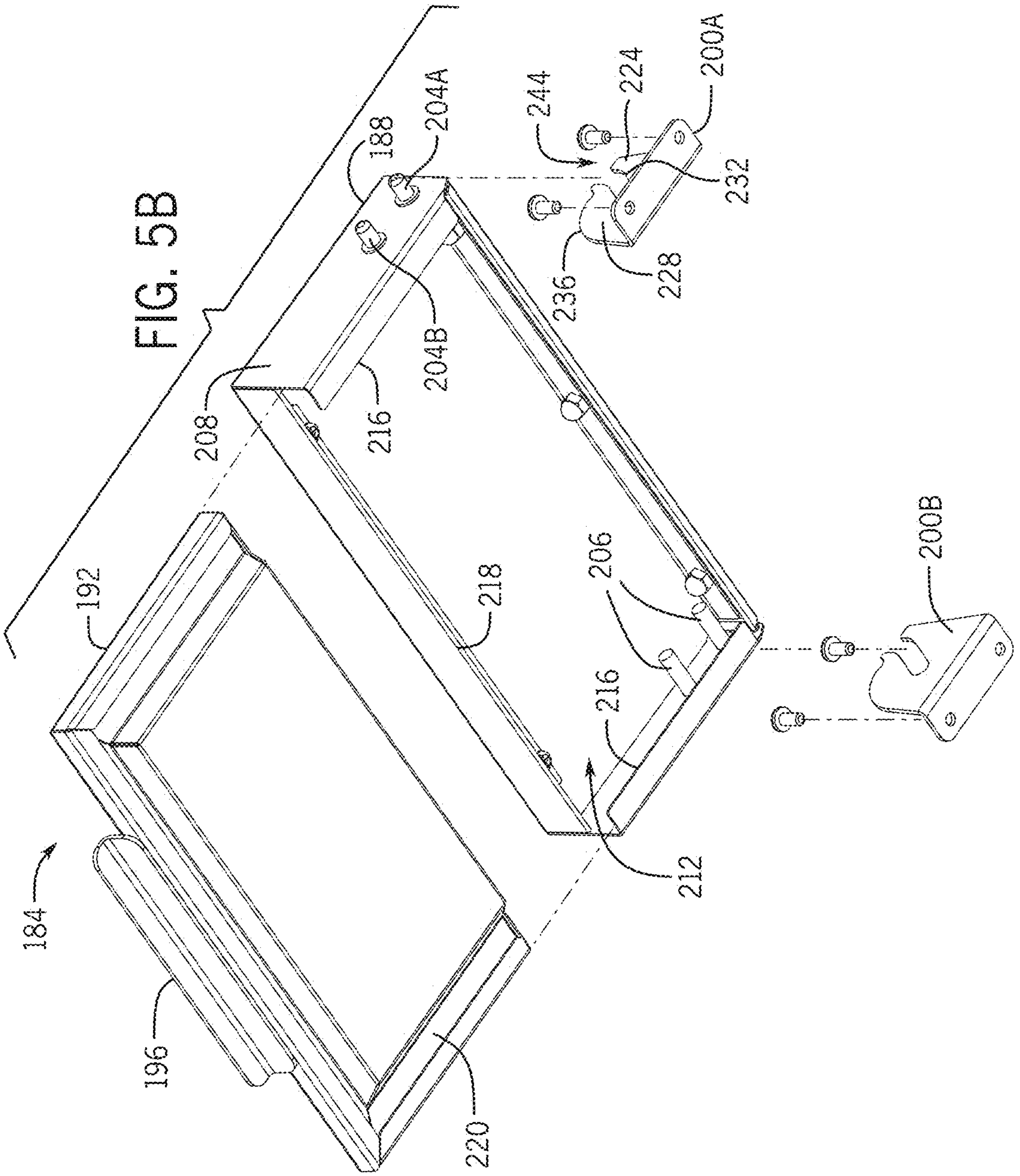
FIG. 5B is an exploded bottom isometric view of the lid assembly of FIG. 1.

Referring to the exploded view of the lid assembly 184 shown in FIGS. 5A and 5B, the first panel 188 includes a first protrusion 204A and a second protrusion 204B extending from a right lateral side 208. Though not shown in FIGS. 5A and 5B, it should be appreciated that the first panel 188 similarly includes first and second protrusions extending from a left lateral side. The first panel further includes a cavity 212. The cavity 212 includes a track 216 disposed along lateral sides of the cavity 212 and is defined on one side by a front lip 218. Correspondingly, the second panel 192 includes a sliding portion 220 that is dimensioned to be received by the track 216. The second panel 192 further includes a rear stop 222 that extends vertically from a top side of the second panel 192 along a back edge. In the example shown, the second panel 192 is also configured to taper in height/thickness from a back portion toward a front portion proximate the handle 196.

The track 216 and the sliding portion 220 allow the second panel 192 to slide between a retracted position (see, for example, FIGS. 1 and 2) and an extended position (see, for example, FIGS. 3 and 4). In the retracted position, the second panel 192 is nested within the cavity 212 of the first panel 188. In the example embodiment, when nested in the cavity 212, the second panel 192 is partially bounded between the track 216 and multiple cylindrical projections 206 that extend inward from interior surfaces of the lateral sides (e.g., the right lateral side 208 and, while not shown, mirrored cylindrical projections on the opposite lateral side), thus helping to inhibit excessive nonplanar movement between the first panel 188 and the nested second panel 192. In the extended position, the rear stop 222 may engage the front lip 218, thereby retaining the second panel 192 at least partially within the cavity 212. In one example of disassembling the lid assembly 184, the second panel 192 can be tilted relative to the first panel 188 when in the extended position, such that the rear stop 222 is disengaged from the front lip 218. The second panel 192 may then be fully removed from the cavity 212. Similarly, in one example of assembling the lid assembly 184, the second panel 192 can be tilted relative to the first panel 188, the rear stop 222 may be inserted into the cavity 212, and the second panel 192 may be then tilted in an orientation that is parallel with the first lid 188, thereby completing the assembly between the first panel 188 and the second panel 192.

In use, starting from the fully closed position, for example, a user may push the second panel 192 into the cavity 212, thereby translating the second panel 192 relative to the first panel 188 and uncovering a portion of first open top area 152. The user may then use the handle 196 to pivot the first panel 188 relative to the first compartment 132 thereby uncovering the first open top area 152. In a corresponding manner, starting from the fully opened position, the user may use the handle 196 to pivot the first panel 188 relative to the first compartment 132, thereby covering a portion of the first open top area 152. The user may then pull the handle 196 away from the first panel 188 to move the second panel 192 to a partially or fully extended position, thereby at least covering a portion of the first open top area 152.

Figure 6:
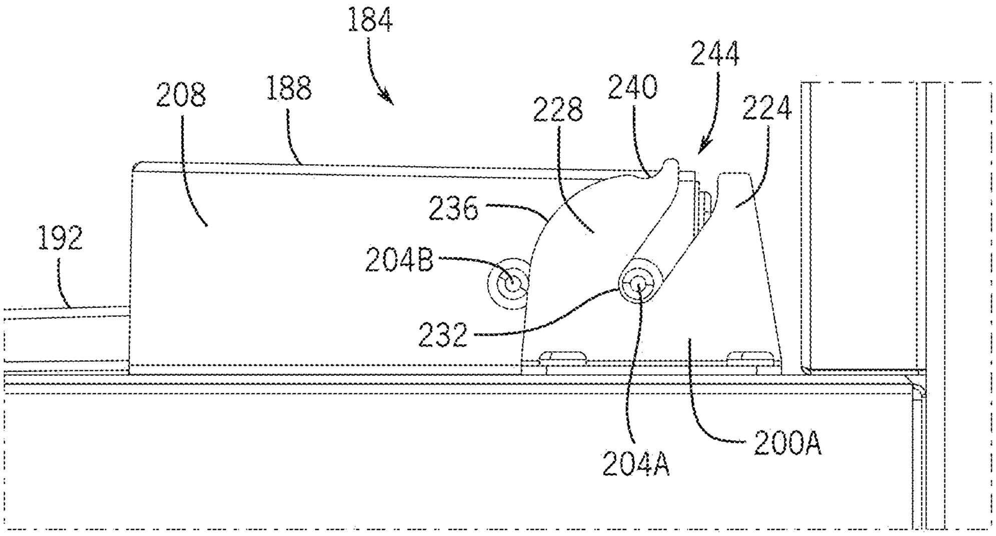
FIG. 6 is a partial right side view as outlined by line 6-6 of FIG. 4 of the lid assembly in the fully closed position.
Figure 7:
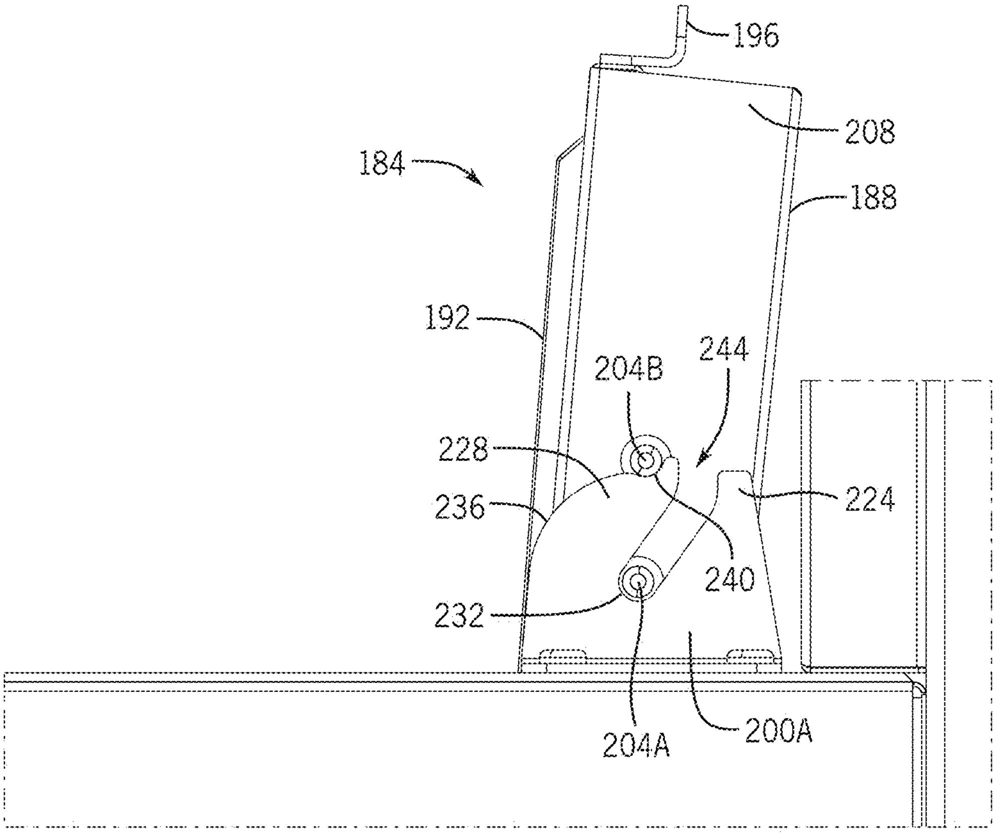
FIG. 7 is a partial right side view of the lid assembly in the fully opened position.

FIGS. 6 and 7 illustrate a partial side view of the refrigeration device 100 and, in particular, the hinge 200A. While the following description will refer to the hinge 200A, it should be appreciated that a like-description may be applied to the hinge 200B. In the illustrated embodiment, the hinge 200A includes a first arm 224 and a second arm 228 with a slot 232 disposed therebetween. The second arm 228 includes a guide surface 236 that terminates in an engagement feature, which is configured as a notch 240 in the illustrated embodiment; however, other configurations are possible. For example, the second arm 228 may include an engagement feature that is configured as a protrusion that is dimensioned to engage a recess on the lid assembly 184. As illustrated in the partial view of the lid assembly 184, the first protrusion 204A engages the slot 232 and the second protrusion 204B engages the guide surface 236. When the first panel 188 is rotated from the closed position to the opened position as illustrated in FIG. 7, the second protrusion 204B travels in an arc along the guide surface 236 and is seated in the notch 240. The engagement of the second protrusion 204B with the notch 240 facilitates securing the lid assembly 184 in the fully opened position to allow increased access to the first compartment 132 while the lid assembly 184 is in a self-sustained and fully opened position.

In the embodiment shown, the slot 232 includes an open top end 244 such that the lid assembly 184 can be removed from the hinge 200A by sliding the first protrusion 204A out of engagement with the slot 232. The open end 244 of the slot 232 facilitates installation of the lid assembly 184 with the refrigeration device 100; however, other configurations are possible. For example, the slot 232 may not include an open top end 244 such that the slot 232 forms a closed boundary. In other embodiments, a hinge may include additional or alternative engagement features that interact with the lid assembly 184, such that the lid assembly 184 can be moved between a fully opened and a fully closed position. For example, the lid assembly 184 may be pivotably secured to the refrigeration device 100 via a barrel, piano, or butterfly hinge. Further, while the lid assembly 184 in the example embodiment is shown to include the first panel 188 and the second panel 192, other configurations are possible. For example, a lid assembly may include a single panel movable between an opened position and a closed position.

Figure 8:
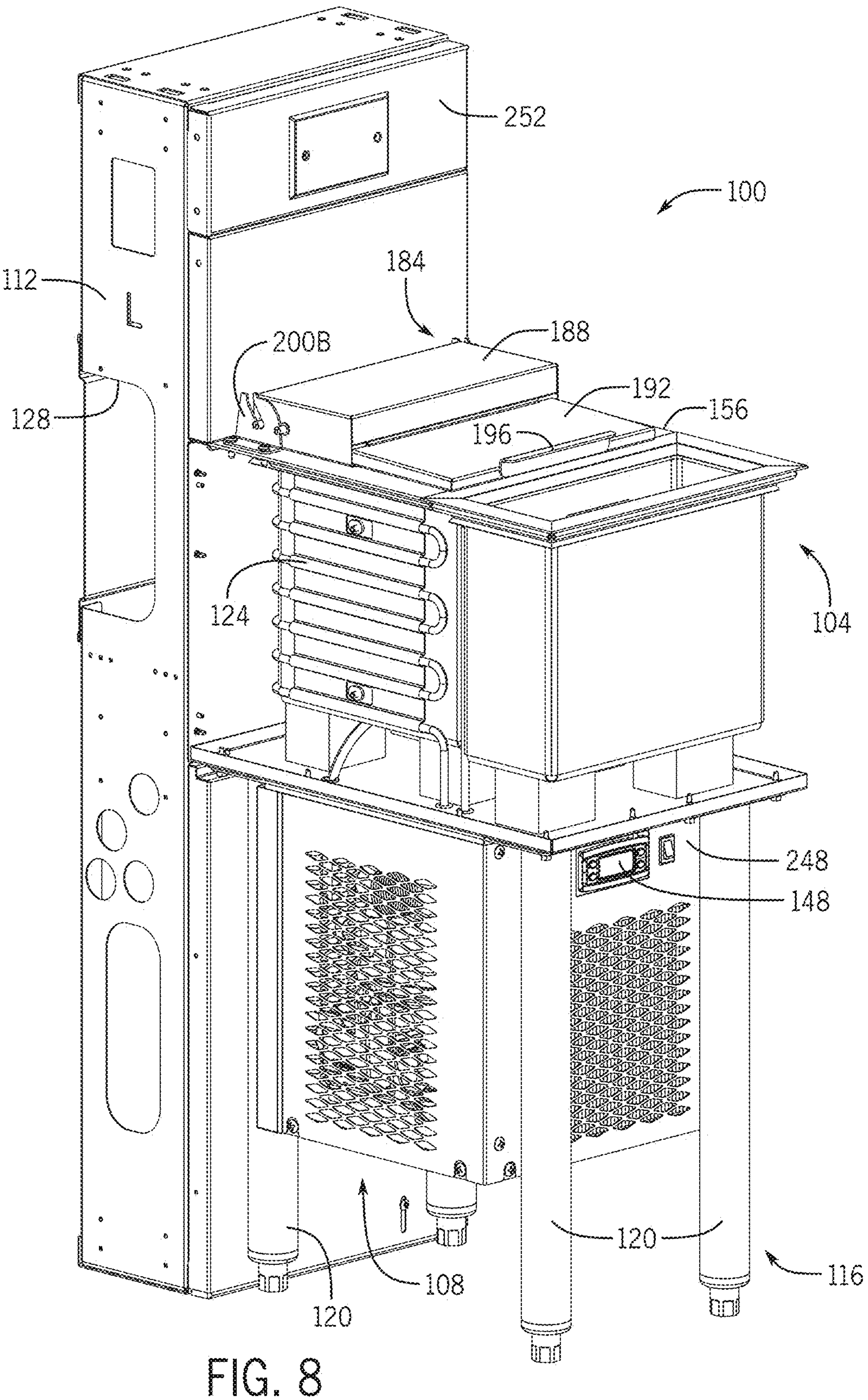
FIG. 8 is a partial assembly isometric view of the refrigeration device of FIG. 1.

Referring now to FIG. 8, the coils 124 are illustrated as at least partially surrounding the storage portion 104. In the embodiment shown, the coils 124 surround the storage portion 104 proximate to the first compartment 132 around the exterior sides and back of the storage portion 104. As such, the controller 148 is configured to control the temperature of the first compartment 132. While the example refrigeration system 108 is generally depicted as employing a refrigeration cycle (e.g., such as via a compressor, condenser, and evaporator arrangement), other techniques can be implemented, such as a piezoelectric refrigeration system. In one example, a user may adjust the controller 148 to set the temperature of the first compartment 132 to a temperature that is between −25 degrees Fahrenheit and 10 degrees Fahrenheit; however, other temperature ranges are possible, for example, between −30 degrees Fahrenheit and 32 degrees Fahrenheit. In the illustrated embodiment, the controller 148 is shown on a cover 248 of the refrigeration system 108; however, other configurations are possible. For example, the controller 148 may be located on alternative areas of the refrigeration device 100, such as the top surface 156 or a backsplash 252. In other embodiments, a controller that is configured to control the temperature of at least one of the first compartment 132 and the second compartment 136 may be remote from the refrigeration system.

Figure 9:
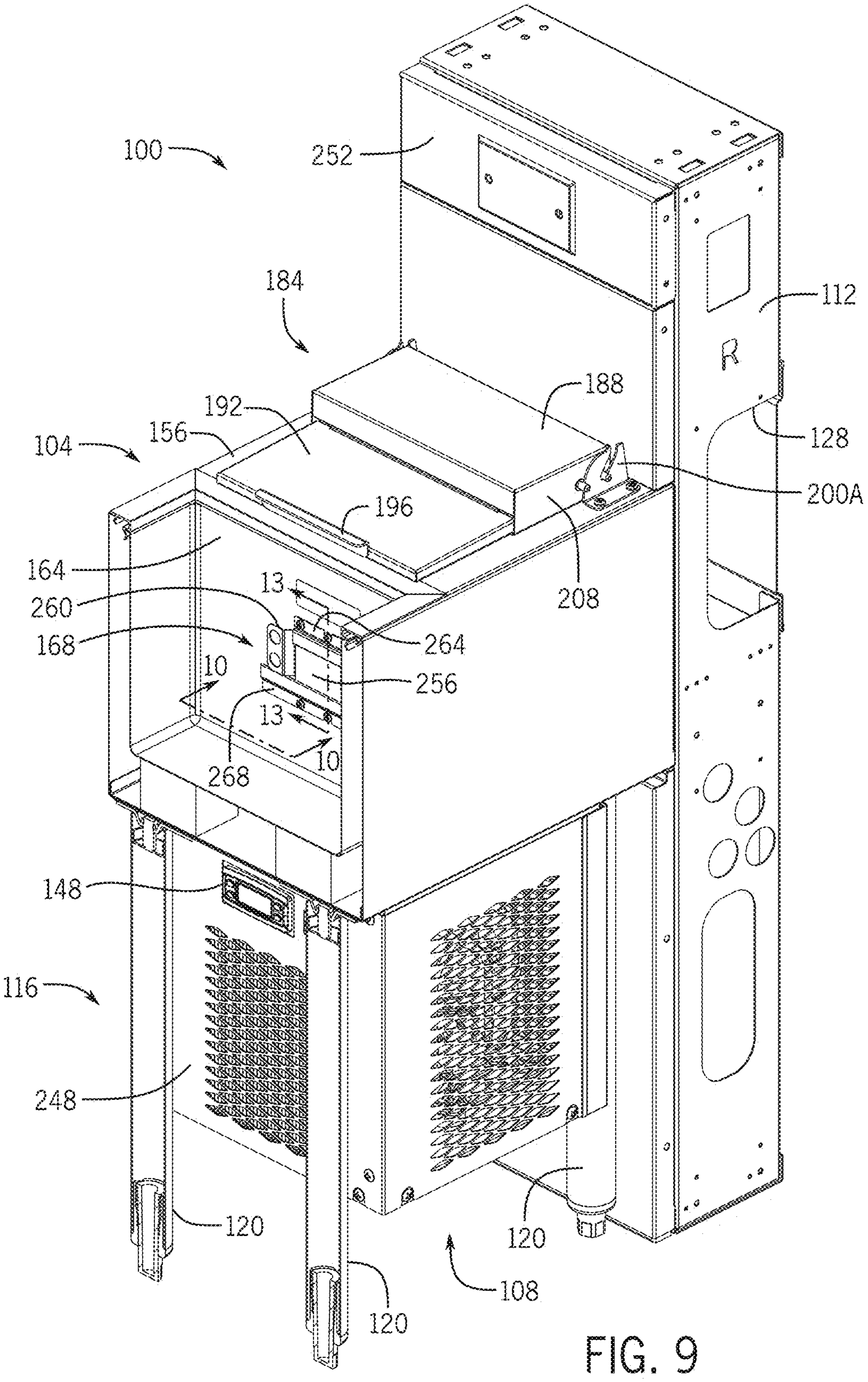
FIG. 9 is an isometric cross-sectional view of the refrigeration device of FIG. 1 taken along the line 9-9 of FIG. 3.

Referring now to FIGS. 9-14, an example embodiment of the temperature regulator 168 is shown. In particular, FIG. 9 shows a cross section of the refrigeration device taken along the line 9-9 of FIG. 3. The temperature regulator 168 includes a damper 256 that has a tab 260. The tab 260 facilitates sliding the damper 256 relative to the wall 164. In the illustrated embodiment, the damper 256 includes interface features (e.g., a pair of openings through the tab 260) and is configured to slide between a first rail 264 and a second rail 268; however, other configurations are possible. For example, a damper may use a single track to translate relative to the wall 164. In the embodiment shown, the first rail 264 and the second rail 268 each extend in a direction that is substantially parallel to the top surface 156 of the storage portion 104 within the second compartment 136. In other embodiments, the first rail 264 and the second rail 268 may extend in a direction non-parallel to the top surface 156. In other embodiments, a mechanism for adjusting a temperature regulator may be disposed within the first compartment 132. In still other examples, the damper may comprise a series of louvers, slots, triangular segments, and the like that are adapted to be incrementally moveable to alter the overlap between the particular damper form factor and a particular form factor of the duct, thus altering the amount of thermal communication between compartments.

Figure 10:
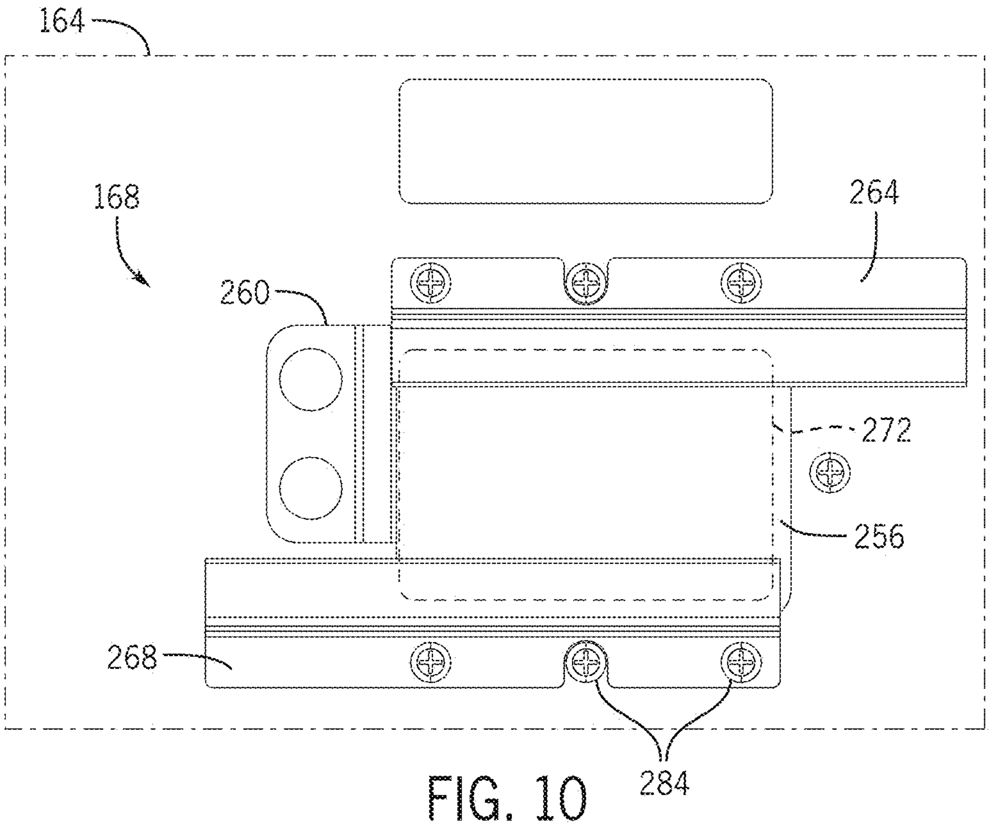
FIG. 10 is a partial front view from vantage 10-10 of FIG. 9 including a damper in a minimum position according to an embodiment of the invention.

The temperature regulator 168 and its practicality will now be described with reference to FIGS. 10-14. FIG. 10 illustrates the damper 256 fully overlapping a duct 272. The duct 272 is defined by the wall 164 and provides thermal communication between the first compartment 132 and the second compartment 136. Thermal communication is primarily achieved via natural convection through the duct 272 due to the temperature difference of air in the first compartment 132 and the second compartment 136; however, other forms of heat transfer, including conduction and radiation, can be considered as part of the overall thermal communication. In other forms, forced convection may be used to enhance the thermal communication via the duct 272, such as by placement of a fan along the duct 272.

Figure 11:
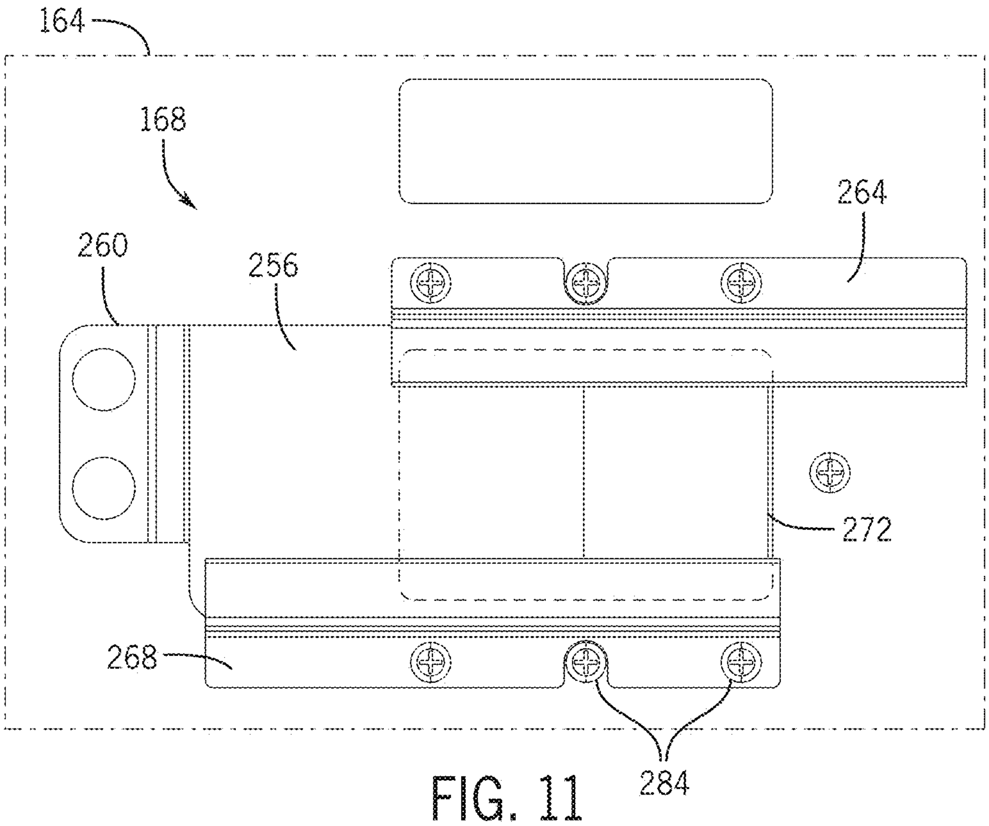
FIG. 11 is a partial front view from vantage 10-10 of FIG. 9 including the damper in a position between the minimum position and a maximum position according to an embodiment of the invention.
Figure 12:
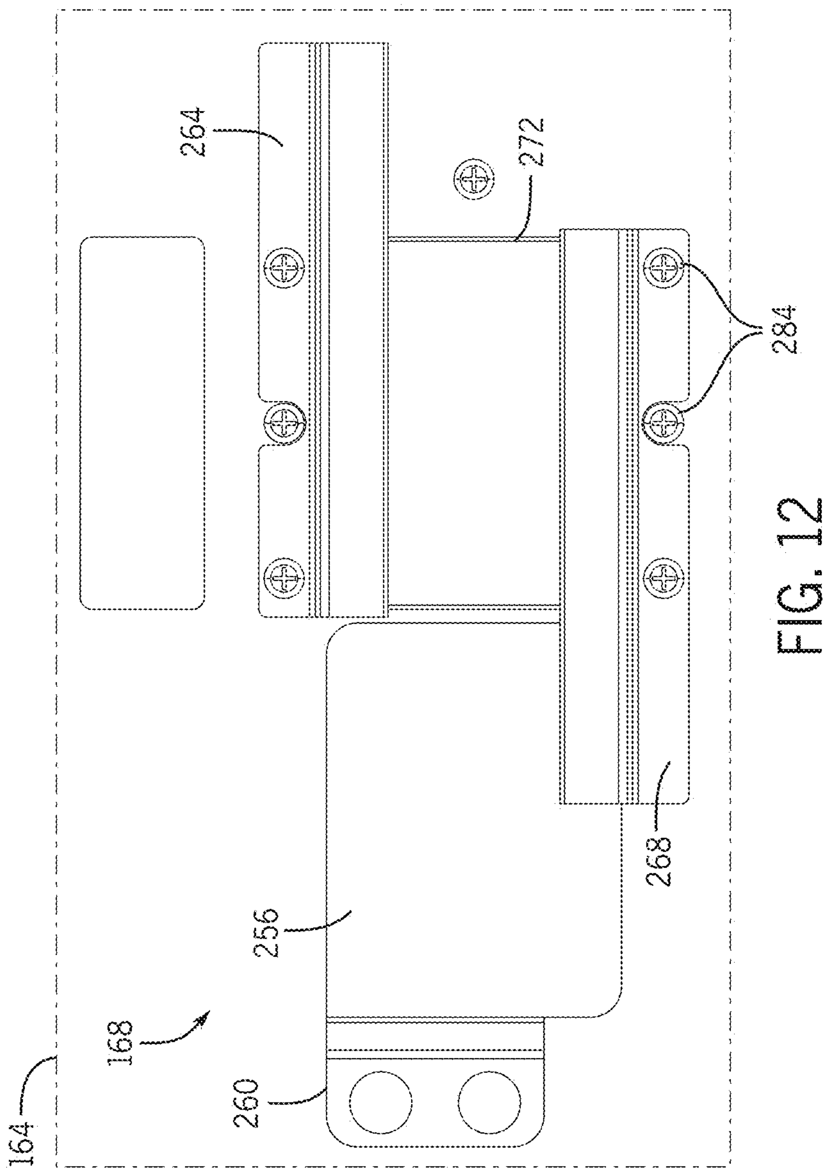
FIG. 12 is a partial front view from vantage 10-10 of FIG. 9 including the damper in the maximum position according to an embodiment of the invention.

As shown, the damper 256 is in a minimum position, such that airflow is inhibited through the duct 272 between the first compartment 132 and the second compartment 136. FIG. 11 illustrates the damper 256 in an intermediate position such that the duct 272 is partially exposed and intermediate thermal communication between the first compartment 132 and the second compartment 136 is allowed. In FIG. 12, the damper 256 is in a maximum position such that the damper 256 does not overlap the duct 272 and the duct 272 is substantially fully exposed. The maximum position, as illustrated, allows maximum thermal communication between the first compartment 132 and the second compartment 136. Given the benefit of this disclosure, one skilled in the art will appreciate the various alternative form factors available, such as a circular duct with a circular damper having a fixed plate and a rotatable plate, each plate defining alternating triangular openings and solid segments that can be rotated to alter the overlap between the openings and the segments.

The temperature regulator 168 allows the temperature of the second compartment 136 to be adjusted, such as by a user sliding the damper 256 to a desired position of overlap with the duct 272. In the illustrated embodiment, the temperature of the second compartment 136 may be adjusted between 30 degrees Fahrenheit and 55 degrees Fahrenheit; however, other temperature ranges are possible. For example, the temperature of the second compartment 136 may be adjusted between −25 degrees Fahrenheit and 70 degrees Fahrenheit. In use, a user may engage the tab 260 and slide the damper 256 relative to the duct 272 towards the maximum position, thereby lowering the temperature of the second compartment 136. Alternatively, the user may slide the damper 256 towards the minimum position, thereby increasing the temperature of the second compartment 136. Based on the thermal communication through the duct 272, it should be understood that the temperature of the first compartment 132 affects the achievable temperature range within the second compartment 136.

Figure 13:
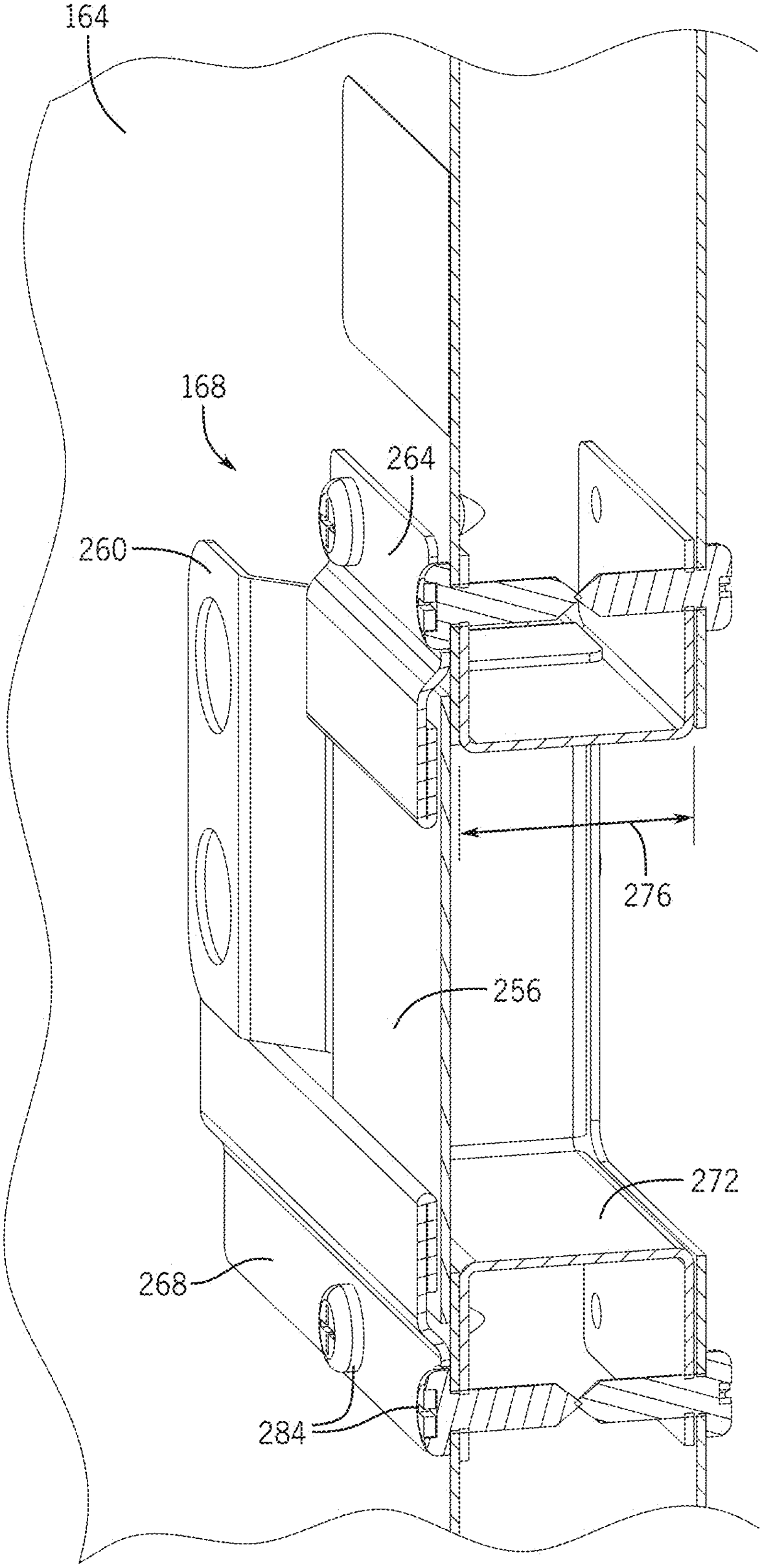
FIG. 13 is a cross sectional view of the damper of FIG. 9 taken along the line 13-13 of FIG. 9.
Figure 14:
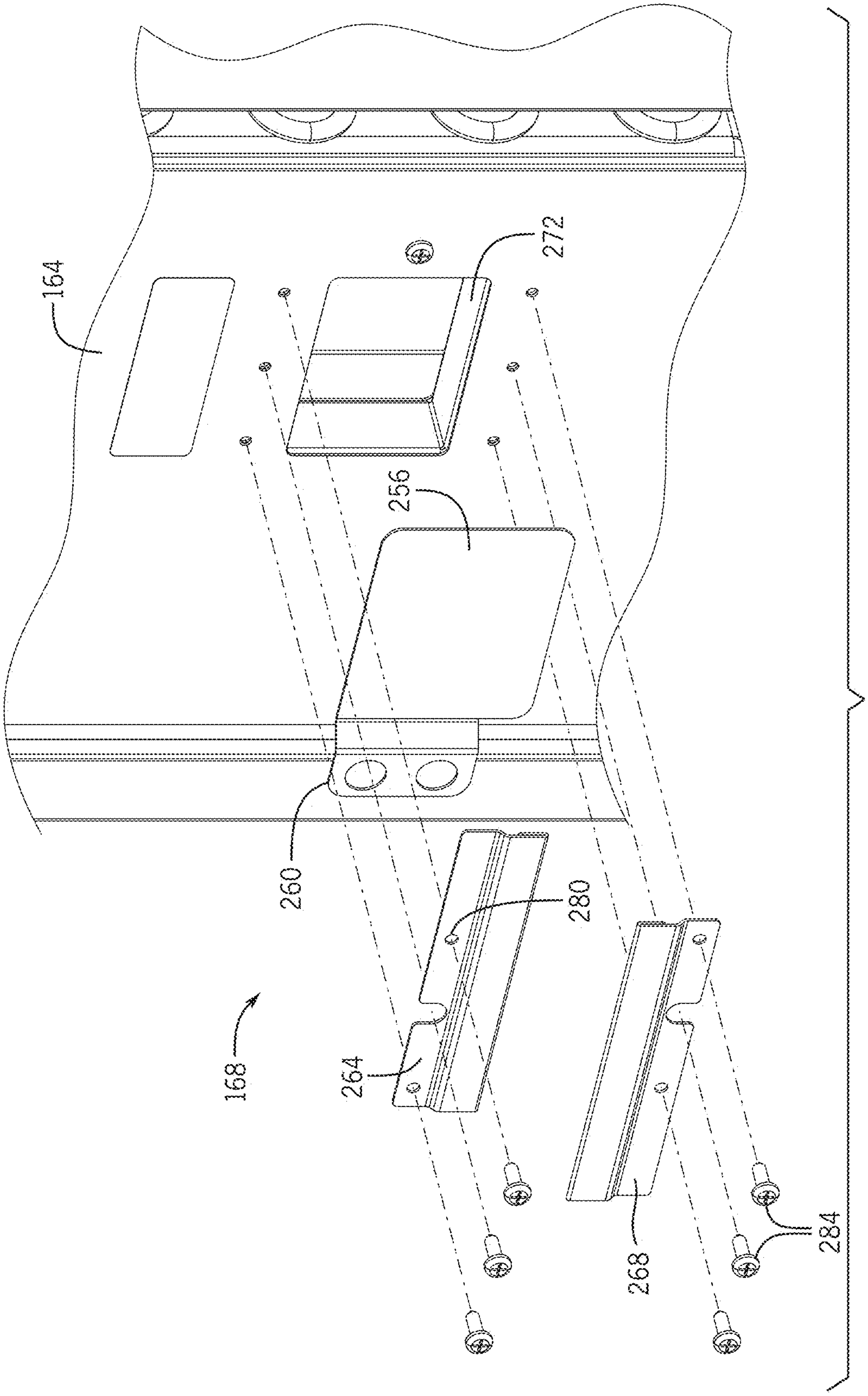
FIG. 14 is a partial exploded view of the damper of FIG. 9.

Referring now to FIGS. 13 and 14, the wall 164 defines a thickness 276 that facilitates thermal insulation in each of the first compartment 132 and the second compartment 136. The duct 272 extends through the entire thickness 276 of the wall 164 in a direction substantially perpendicular to the wall 164. The direction that the duct 272 extends through the wall facilitates the thermal communication therethrough while providing the shortest airflow path through the wall between each of the first compartment 132 and the second compartment 136.

In other forms, the form factor (e.g., cross section) and/or orientation (e.g., longitudinal orientation relative to horizontal) of the duct 272 can be adapted to alter the resulting thermal communication properties. For instance, increasing the cross section and angling the duct to slope downwardly from the second compartment 136 to the first compartment 132 may enhance thermal communication via a duct. Furthermore, the vertical placement of the duct 272 on the wall 164 (relative to the bottom of the first compartment 132 and the second compartment 136) can impact the thermal communication as the temperature gradient in the first compartment 132 can be altered, for instance. In the example shown, the duct 272 is positioned approximately below the vertical middle of the wall 164. In other forms, the position of the duct 272 can be raised or lowered to increase or decrease the temperature gradient achievable between the first compartment 132 and the second compartment 136. In other embodiments, the wall 164 may define additional ducts to alter the thermal communication properties and provide a higher resolution of user control, such as increased precision in temperature adjustability.

FIGS. 13 and 14 further illustrate a method of attachment for each of the first rail 264 and the second rail 268 to the wall 164. As shown, each of the first rail 264 and the second rail 268 include a plurality of through holes 280 dimensioned to receive a plurality of fasteners 284. The fasteners 284 extend through the holes 280 and into the wall 164. In one example installation method, each of the first rail 264 and the second rail 268 may be installed on and secured to the wall 164. The damper 256 may then be inserted into the space formed between the rails 264, 268 and the wall 164. In another example, the damper 256 may be positioned in front of the duct 272 and secured vertically by attaching the first rail 264 and the second rail 268 to the wall 164.

Figure 15:
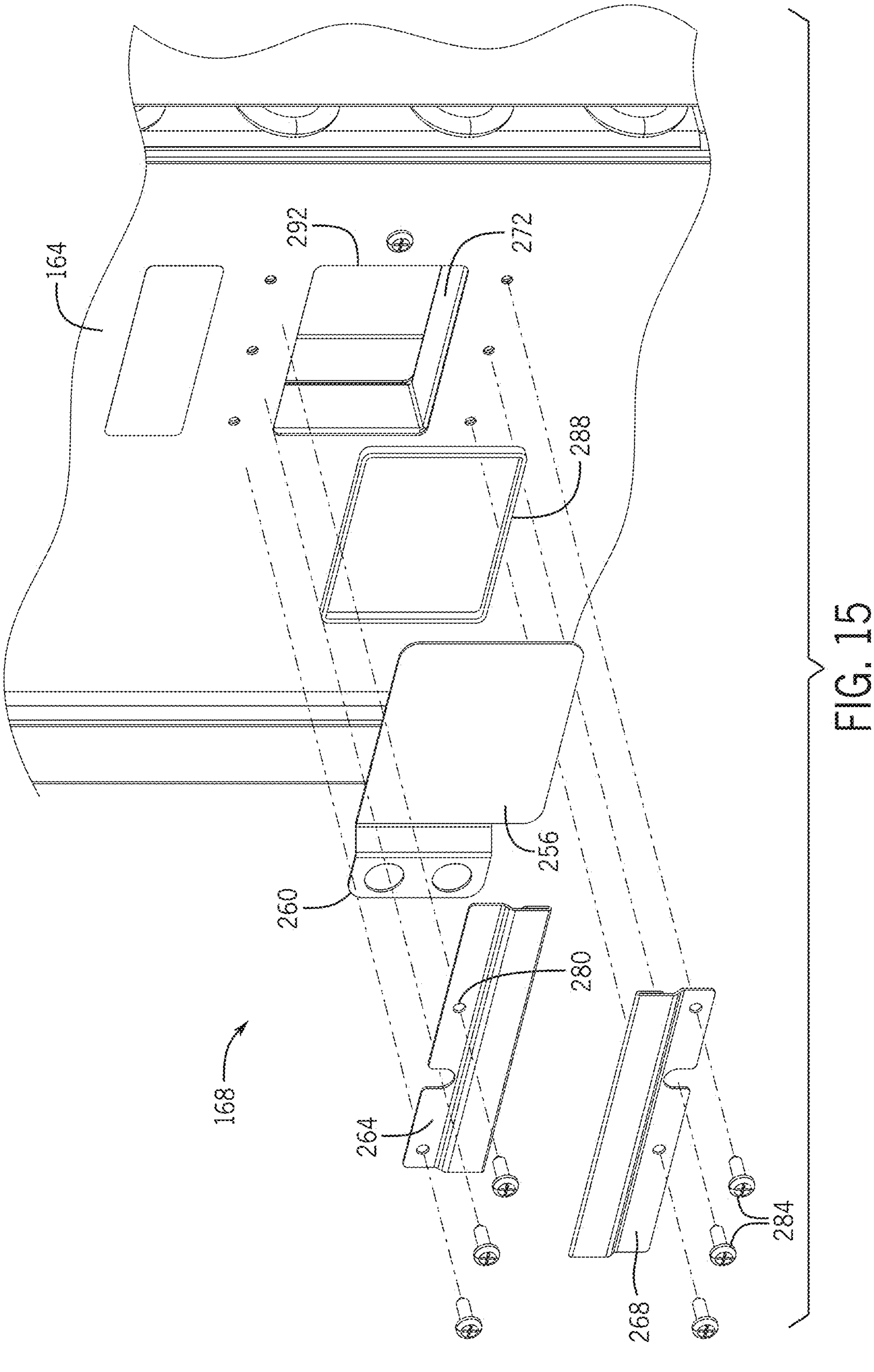
FIG. 15 is a partial exploded view of a damper according to another embodiment of the invention.

FIG. 15 illustrates another embodiment of the temperature regulator 168 that includes a seal 288. In one embodiment, the seal 288 can be adhered to the wall 164. In another embodiment, the seal 288 can be adhered to the damper 256. The seal 288 is dimensioned to surround an outer edge 292 of the duct 272 and provide a seal between the damper 256 and the wall 164. The seal 288 reduces unwanted airflow between the first compartment 132 and the second compartment 136, particularly when the damper 256 is in the minimum position. The seal 288 may also act as a point of resistance between the damper 256 and the wall 164, such that additional force is required to translate the damper 256 relative to the wall 164. Such resistance may limit unwanted movement of the damper 256 when the refrigeration device 100 is in use. For instance, a user may be taking a bottle, or other items, in and out of the second compartment 136. The bottle or item may inadvertently come into contact with the temperature regulator 168 and the resistance imparted by the seal 288 between the damper 256 and the wall 164 will keep the damper 256 in the preset, desired location.

Any of the embodiments described herein may be modified to include any of the structures or methodologies disclosed in connection with different embodiments. Further, the present disclosure is not limited to the refrigeration device type specifically shown. As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. Various features and advantages of the invention are set forth in the following claims.

The invention claimed is:

1. A refrigeration device, comprising:

a storage portion including a wall that facilitates thermal insulation of a compartment that is configured to store items at a temperature that is below ambient air temperature, wherein the compartment defines an open top area that is bordered by a top surface of the storage portion;

a temperature controller that is mounted to a cover and configured to control the temperature of the compartment; and a lid assembly that includes a first panel, a second panel, a handle, and a hinge, wherein the lid assembly is movably coupled to the refrigeration device at the top surface, wherein, in a partially closed position, a portion of the open top area is uncovered by the lid assembly, and in a fully closed position, the portion of the open top area is covered by the lid assembly, and wherein the second panel is configured to slide parallelly to the top surface along a track by connection with the first panel to at least partially cover or uncover the portion of the open top area, and wherein the second panel is configured to tilt relative to the first panel.

2. The refrigeration device of claim 1, wherein the storage portion of the refrigeration device defines a volume of between 0.05 cubic feet and 2 cubic feet.

3. The refrigeration device of claim 1, wherein the refrigeration device includes a backsplash.

4. The refrigeration device of claim 1, wherein a refrigeration system is configured to circulate fluid through a series of coils.

5. The refrigeration device of claim 1, wherein the second panel includes the handle of the lid assembly.

6. The refrigeration device of claim 5, wherein the handle is configured to be used to pivot the second panel relative to the compartment.

7. The refrigeration device of claim 6, wherein the hinge includes a first hinge and a second hinge, and wherein the lid assembly is engaged with both the first hinge and the second hinge.

8. The refrigeration device of claim 7, wherein the first and second hinges are coupled to the first panel.

9. The refrigeration device of claim 8, wherein the track is disposed along an underside of the first panel.

10. The refrigeration device of claim 1 further comprising a refrigeration system including a compressor, a condenser, and an evaporator.

11. The refrigeration device of claim 10, wherein the compartment is configured to be divided into a first section and a second section, and wherein, in the partially closed position, the lid assembly covers the portion of the open top area adjacent to the first section of the compartment and does not cover a portion of the open top area adjacent to the second section.

12. The refrigeration device of claim 1, wherein the temperature of the compartment is configured to be between −25 degrees Fahrenheit and 70 degrees Fahrenheit.

13. The refrigeration device of claim 1, wherein the compartment is configured to store ice.

14. The refrigeration device of claim 13, wherein the compartment includes corners having rounded portions.

15. A refrigeration device, comprising:

a temperature controller that is mounted on a cover;

a refrigeration system that is configured to circulate fluid through a series of coils, wherein the temperature controller is in communication with the refrigeration system;

a storage portion including a wall that facilitates thermal insulation of a compartment that is configured to store items at a temperature that is below ambient air temperature by refrigeration provided by the refrigeration system, wherein the compartment defines an open top area that is bordered by a top surface of the storage portion; and a lid assembly that includes a first panel, a second panel, a handle, a track, and a sliding portion, wherein the lid assembly is movably coupled to the refrigeration device at the top surface, wherein, in a partially closed position, a portion of the open top area is uncovered by the lid assembly, and wherein the first panel is configured to move relative to the compartment and the second panel is configured to move along the track relative to the first panel between a retracted position and an extended position, wherein the second panel is nested within the first panel in the retracted position.

16. The refrigeration device of claim 15, wherein the storage portion of the refrigeration device defines a volume between 0.05 cubic feet and 2 cubic feet.

17. The refrigeration device of claim 15, wherein the refrigeration device includes a backsplash and a mounting bracket assembly.

18. The refrigeration device of claim 15, wherein the compartment is configured to be divided into a first section and a second section, and wherein, in the partially closed position, the lid assembly covers the portion of the open top area adjacent to the first section of the compartment and does not cover a portion of the open top area adjacent to the second section.

19. The refrigeration device of claim 18, wherein the second panel includes the handle of the lid assembly, the handle being configured to be pushed or pulled to translate the second panel between the retracted position and the extended position.

20. The refrigeration device of claim 18, wherein the track is disposed along an underside of the first panel.

21. A refrigeration device, comprising:

a temperature controller that is mounted on a cover;

a refrigeration system that is configured to circulate fluid through a series of coils, wherein the temperature controller is in communication with the refrigeration system;

a storage portion including a wall that facilitates thermal insulation of a compartment that is configured to store items at a temperature that is below ambient air temperature by refrigeration provided by the refrigeration system, wherein the compartment defines an open top area that is bordered by a top surface of the storage portion; and a lid assembly that includes a first panel, a second panel, a handle, and a sliding portion that is dimensioned to be received by a track, wherein the lid assembly is movably coupled to the refrigeration device at the top surface, wherein, in a partially closed position, a portion of the open top area is uncovered by moving the sliding portion of the lid assembly along the track, and wherein the first panel is configured to move relative to the compartment and the second panel is configured to move relative to the first panel between a retracted position and an extended position, wherein, in the partially closed position, the first panel is substantially parallel with the top surface when the second panel is in the retracted position.

22. The refrigeration device of claim 21, wherein the track is disposed along lateral sides of a cavity and is defined on one side by a front lip.

23. The refrigeration device of claim 22, wherein the track and the cavity are disposed along an underside of the first panel, and wherein the second panel is configured to slide along the track by connection with the first panel.

24. The refrigeration device of claim 21, wherein the second panel includes a back portion and the first panel includes a front portion, and wherein the second panel is tilted relative to the first panel to disengage the back portion from the front portion.

25. The refrigeration device of claim 24, wherein, in a fully closed position, the portion of the open top area is covered by the lid assembly and the second panel is in an orientation that is parallel with respect to the first panel.

26. The refrigeration device of claim 21, wherein the lid assembly is movably coupled at the top surface by a pair of hinges.

27. The refrigeration device of claim 21, wherein the refrigeration system includes a compressor, a condenser, and an evaporator.

28. The refrigeration device of claim 21, wherein the refrigeration device further includes a base, a backsplash, and a mounting bracket assembly.

29. The refrigeration device of claim 28, wherein the second panel includes a front portion, a back portion, and a top side, wherein the handle is disposed proximate the front portion.

* * * * *